May 3, 1927.
A. T. NYBLOM
1,627,060
DIRIGIBLE HEADLIGHT FOR AUTOMOBILES
Filed June 9, 1925
2 Sheets-Sheet 1
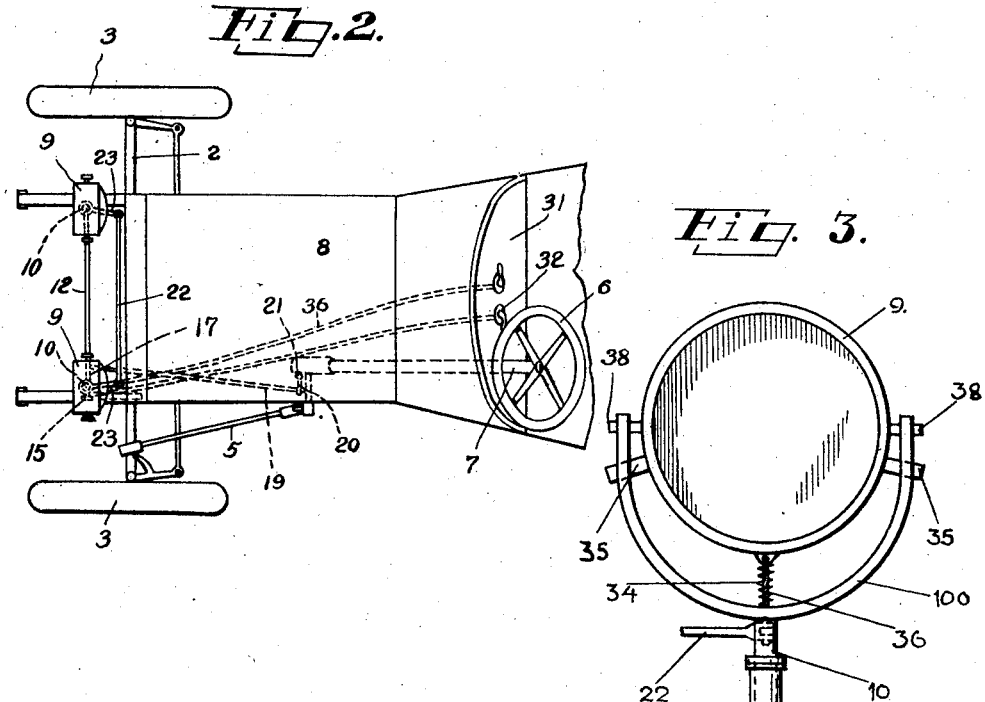
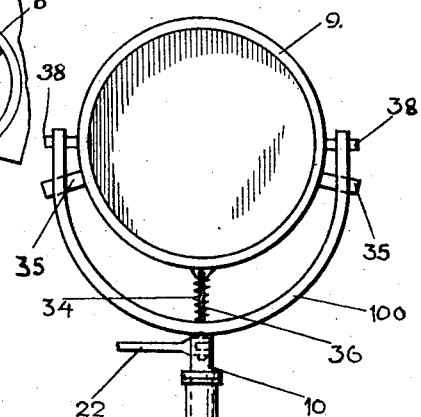
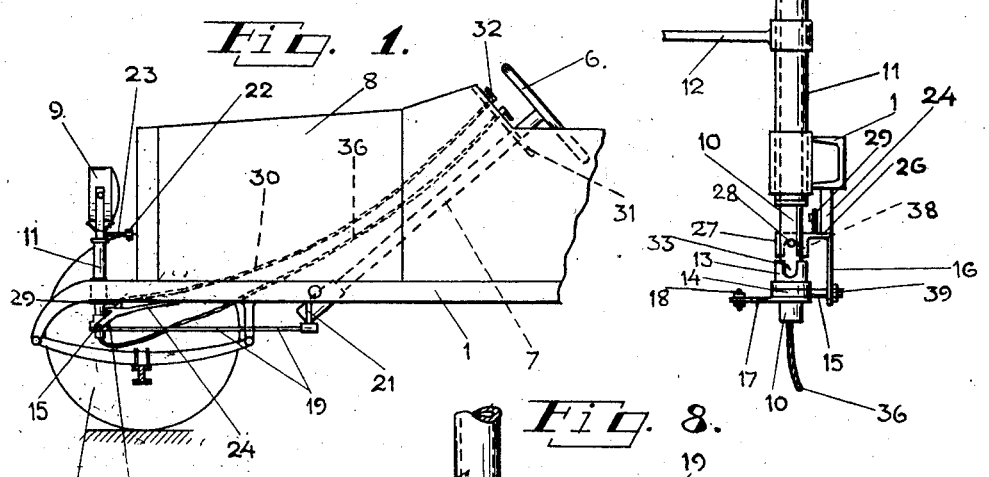
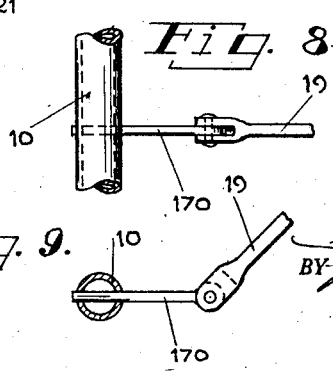
INVENTOR.
A. T. Nyblom
BY Marks Clerk
ATTORNEYS.

May 3, 1927.
A. T. NYBLOM
1,627,060
DIRIGIBLE HEADLIGHT FOR AUTOMOBILES
Filed June 9, 1925   2 Sheets-Sheet 2
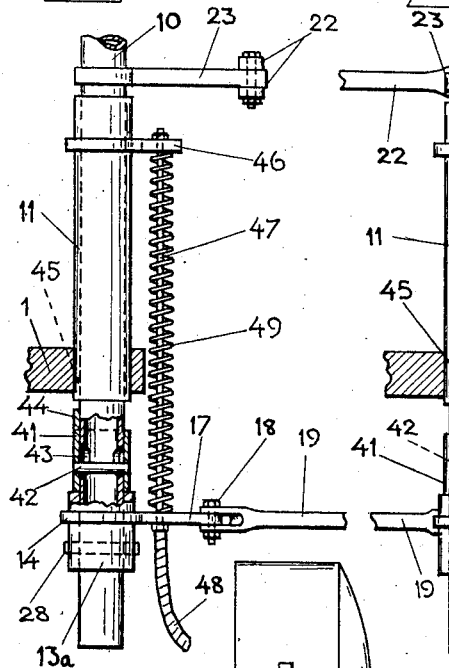
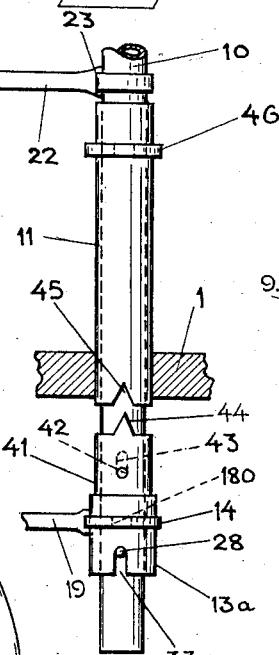
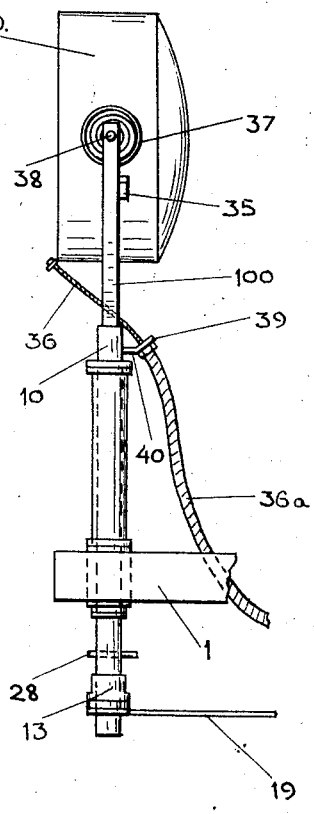
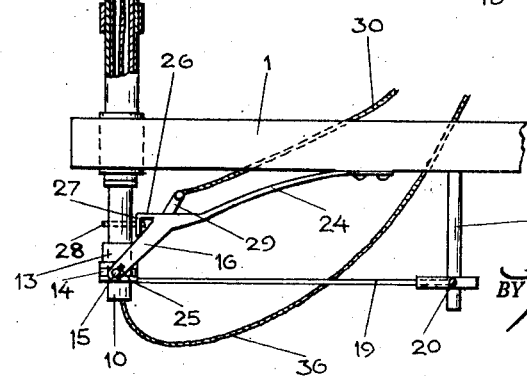
INVENTOR.
A. T. Nyblom
BY Marks Clark
ATTORNEYS.

Patented May 3, 1927.

1,627,060

UNITED STATES PATENT OFFICE.

AXEL T. NYBLOM, OF VARBERG, SWEDEN.

DIRIGIBLE HEADLIGHT FOR AUTOMOBILES.

Application filed June 9, 1925, Serial No. 35,986, and in Sweden June 16, 1924.

This invention relates to means for operating the headlights of an automobile so as to direct the rays of the headlights from side to side or up and down for the objects mentioned herebelow.

The directing of the rays of the headlights from side to side has for its object to make use of the headlights really as a searchlight when the automobile changes its way, so that the driver may be able to inspect the road in proper time, before the vehicle has commenced its way in the new direction. For this purpose the headlights are connected to the steering gear either nonvariably or momentarily, so that the headlights are rotated simultaneously and automatically with the steering gear of the vehicle.

The directing of the rays of the headlight up and down has for its object to blind the light when driving on the streets in a town, when meeting other automobiles, or elsewhere when the driver has no use for the lighting of a longer way ahead, or when he does not want to disturb the sight of meeting persons. Hitherto it is customary to blind the headlights by decreasing the strength of the rays, but every automobile driver has doubtless experienced, that such a method of blinding the headlights disturbs the sight very badly when the rays in the next moment are reincreased to their full power. One object of this invention therefore is to blind the headlights in such a way, that the strength of the rays is retained at full power, but the headlight directed downwards, so that the rays are thrown down upon the road close ahead of the vehicle. By this means the strength of the light is not affected, and the driver does not become blind when in the next moment the rays are once again thrown straight ahead.

One object of this invention is to combine the means for the up-and-down-blinding-movements of the headlights with the first mentioned from-side-to-side-revolving of the same headlights, so that the one kind of these movements can be accomplished without disturbance from the other kind of movements.

Another object of my invention is a dirigible headlight, which can be made stationary or dirigible at the will of the driver by means of a simple operation of an easy reached controller, whereby the device can be designed in two different manners, viz. either so that the headlights normally are kept stationary just as in common automobile practice and by the will of the driver can be momentarily coupled to the steering gear so as to revolve therewith, or that the headlights are normally coupled to the steering gear but at the will of the driver can be momentarily released from said coupling and kept stationary. The principle of the invention will not be affected by said two different embodiments of the improved headlights but merely the design of the device somewhat modified, hence I will describe them herebelow with reference to the annexed drawings.

In the drawings:

Fig. 1 represents in an elevation view the head portion of an automobile provided with the improved headlights.

Fig. 2 is a plan view of the same portion.

Fig. 3 illustrates in a larger scale the one embodiment of the invention, showing from ahead the head light on the left hand side of the automobile with some of the adjacent parts of the vehicle.

Fig. 4 shows the same device from the side partly in section.

Fig. 5 is a side view similar to Fig 4 but illustrating diagrammatically a modified embodiment of the tilting device.

Fig. 6 is a fragmentary front view of a modified embodiment of the revolving means.

Fig. 7 the same device shown from the left hand side and partly in section.

Fig. 8 is a fragmentary side view and

Fig. 9 a fragmentary plan view section of a third embodiment of the revolving means shown in its much simplified design.

In the drawings the same reference letters refer to corresponding parts throughout. In Figs 1 and 2 the frame of the chassis is designated by 1, the front axle by 2, the front wheels by 3 and the steering connections to the front wheles by 5. The steering wheel is marked with 6, its pillar with 7 and the motor housing with 8. There is as usual two headlights 9, which are mounted upon shafts 10 going through hollow stanchions 1, which are stationarily attached to the frame 1 and rigidly connected with each other by a horizontal stay 12. In the embodiments illustrated in Figs. 3, 4, 8 and 9 the shafts 10 are tubular, but they may also be designed solid as though in Figs. 5, 6 and 7.

Referring to the embodiment illustrated in Figs. 3 and 4, the tubular shaft 10 at its lower end carries a sleeve 13, which is rotary about said shaft, and by a collar 14 with a finger 15 is suspended in a bracket 16 from the frame 1, so that the shaft 10 can be revolved within the sleeve 13, as well as the sleeve proper be revolved in relation to the nonrevolving collar 14. From the sleeve 13 projects an arm 17, to which is linked by means of a bolt 18 a rod 19 the rear end of which is linked to an arm 20 projecting from a shaft 21, which is connected with the steering gear (handwheel 6) in any suitable manner, so that, when turning the handwheel 6 in the one or other direction for steering the vehicle, the shaft 21 and thereby the arm 20, link 19 and arm 17 become moved in such a way, that the sleeve 13 is revolved in the same direction, as the front wheels of the vehicle are turned and in a degree corresponding to that of the front wheel I have omitted to illustrate in detail, how the last mentioned connections may be designed, because they can be of any arbitrary construction and may be easily understood by anybody skilled in the art. However, these connections do not make parts of this invention, and the drawings should be too encumbered, if all such parts of a secondary importance for the understanding of the invention should be shown therein.

The shaft 10 of the headlight on the left hand side of the automobile is coupled to the shaft 10 of the headlight on the right hand side by means of a drag rod 22 linked to an arm 23, projecting from the shaft 10, so that the revolving of the left hand headlight 9 causes the right hand headlight to revolve in conformity therewith.

The bracket 16 comprises the end portion of a flat spring 24 attached to the frame 1, and the finger 15 is mounted into an oblong hole 25 in said bracket 16, so that said finger can slide a little up and down within the hole 25. From the bracket 16 projects an arm 26 with a forked end portion 27, which normally grips around a pin 28 inserted through the shaft 10. The bracket 16 further is provided with a finger 29 to which is attached the end of a flexible wire or cord 30. This wire or cord is carried on to the switch board 31 or to any other suitable place in easy reach of the driver and provided with a handle or lever 32, so that when pulling in the wire 30, the driver can lift the bracket 16 off its normal downward position shown in Figs. 3 and 4.

The upper end of the sleeve 13 is provided with a slot 33 which fits the pin 28, if the sleeve 13 is raised along the shaft 10 when the bracket 16 is lifted through the wire 30 as first mentioned. In such a raised position of the bracket 16 its forkended projection 26 has lost its cooperation with the finger 28, so that the slot 33 in the sleeve 13 can engage same.

The now described appliances operate as follows: Normally the wire 30 is slackened, and the bracket 16 stands in its downward position as shown in Figs. 3 and 4 on account of the tension in the spring 24. Under such circumstances the sleeve 13 and forked end portion 27 take in the positions shown in said figures, whereby the pin 28 is grasped by the forked end portion 27 but free from cooperation with the slot 33 in the sleeve 13. The consequence is, that the two headlights 9 are kept stationary in their normal forward directed position, because the pin 28 cannot move out from the grip of the forked member 27. The movements of the shaft 21 caused by the steering gear get transmitted by the rod 19 and arm 17 to the sleeve 13, but have no other effect than a free revolving of the sleeve 13 upon the shaft 10.

If now the automobile driver wants to make the headlights revolve in conformity with the steering of the vehicle, he pulls the wire 30, whereby the bracket 16 by means of the finger 15 and collar 14 lifts the sleeve 13, until the slot 33 therein engages the pin 28, just as the forked member 27 has released the said pin. The movements of the rod 19 caused by the steering gear then get transmitted through the sleeve 13 upon the pin 28 and so upon the shaft 10 with its fork 100 and headlight 9, whereby the drag rod 22 transmits the same revolving motion to the other headlight.

In Figs. 3, 4 and 5 there is also illustrated some means for blinding the headlights by tilting same, so that the rays of the light are thrown down upon the road, whereby said tilting movement can be accomplished without disturbance from the revolving motion just described. In Figs. 3 and 4 said means comprise a spiral spring 34 attached with its lower end to the shaft 10 or to any suitable point of the fork 100, and with its upper end to the rear side of the headlight 9, so that said spring tends to turn the headlight upwards directing the rays of the light upwards. To limit said tendency the headlight is provided with aprons or stoppers 35 which coact with the fork 100 when the headlight stands in its normal straight ahead direction.

In the front side of the headlight there is attached a flexible wire or cord 36, which is carried down within the tubular shaft 10, so that it comes out at the foot of said tubular shaft. From here the wire or cord 36 is carried away to the switch board 31 or to any other place in easy reach of the driver.

If the driver wants to reduce the light cone as far as it concerns oncoming vehicles or pedestrians without to reduce the strength of the light proper, he pulls the wire 36, whereby the action of the spring 34 becomes overcome and the headlight tilted, so that the rays of the light are thrown down upon the road at some few feet ahead of the automobile. As soon as the driver wants to light up his course again, he slackens the wire 36, and the spring 34 swings the headlight upright as shown in Fig. 4.

The very same result will be obtained by the somewhat modified device shown in Fig. 5. Here the spiral spring 34 is substituted by a clock spring 37 wound about one of the pivots 38, which carries the headlight in the fork 100, and which is mounted so as to act exactly as the before-mentioned spiral spring 34.

Another modification is illustrated also in Fig. 5, viz. concerning the wire 36, which in said Fig. is carried on the outside of the solid shaft 10 through a lug 39 in a guiding arm 40, which projects from the shaft 10 on the rear side thereof. The wire 36 in this embodiment is shown as the inner cord of a so called Bowden cable the outer hose of which designated by 36ª is attached to the underside of the guide 40. To avoid non-necessary encumbering of the drawing the parts for revolving the headlight shaft 10 are removed from Fig. 5, and only the rod 19 and sleeve 13 are shown diagrammatically.

Of course it is not necessary to combine the solid shaft 10 and the outside disposed wire 36 with exactly the clock spring 37, as the design of the spring for keeping the headlight upright can be varied in many ways, and the two embodiments shown in Figs. 3, 4, respectively Fig. 5 are chosen merely as examples without limiting the invention to either of them nor to the special combinations of parts shown in said figures. So it is evident, that a hollow shaft 10 can be used as well in combination with the clockspring 37.

In Figs. 6–9 the device is reversed as far as it concerns the mode of operating. Here the headlights stand normally in connection with the steering gear, so that the headlights normally follow the variations in the direction of the front wheels 5 and can be momentarily released therefrom at the driver's will. To accomplish this object the sleeve 13ª has a downwards open slot 33ª coacting normally with the pin 28 in the shaft 10. On the upper end of the sleeve 13ª there is a second sleeve 41, which otherwise is independent of the sleeve 13ª, so that the two sleeves 13ª and 41 can be revolved independent of each other, and the sleeve 41 only caused to slide up and down on the shaft 10, when such movements are applied upon the sleeve 13ª. Sleeve 13ª has a collar 14 connected with the rod 19 by means of the arm 17 and bolt 18. A pin 42 is fixed to the sleeve 41 and goes through an extended slot 43 in the shaft 10, so that the sleeve 41 can be slided in a certain degree up and down on the shaft 10 but always remain coupled to the shaft, so that the shaft 10 and the sleeve 41 cannot revolve independent of each other. The upper edge of the sleeve 41 has a wedge shaped projection 44, which corresponds to a similar slot 45 in the lower edge of the stationary stanchion 11. Adjacent the upper end of the stanchion 11 is a bracket 46 with a boring into which is attached the flexible inner cord 47 of a Bowden cable the outer hose 48 of which is at its end fixed to the arm 17 and carried away to the switch board 31 or to any other place in easy reach of the driver, where the inner cord 47 is provided with a suitable handle as usually known on such cables. A spiral spring 49 is inserted between the bracket 46 and the arm 17, so that it tends to keep those parts apart.

The last described embodiment operates as follows. The spring 49 as well as the gravity retain normally the sleeve 13ª in its downward position as illustrated in Figs. 6 and 7 with the slot 33ª in engagement with the pin 28 and the sleeve 41 out of engagement with the slot 45. In this position the shaft 10 by means of the cooperation between the pin 28 and the sleeve 13ª must follow the amplitudes of the steering gear and the rod 19. If now the driver wants to release the headlights from the said influence of the steering gear he pulls the cord 47 whereby the mode of attachment of the hose 48 causes the arm 17 with collar 14 and sleeve 13ª to raise, so that the slot 33ª comes out of engagement with the pin 28, releasing the shaft 10 from cooperating with the steering gear. Simultaneously is the sleeve 41 raised by the action of the sleeve 13ª until the projection 44 engages the slot 45 in the stationary stanchion 11 and lock the shaft 10 in a stationary position. As soon as the driver releases the cord 47, the spring 49 pushes down the arm 17 with collar 14 and sleeve 13ª, uncoupling the sleeve 41 from engagement with the stanchion 11 and coupling the shaft 10 to the steering gear actuated sleeve 13ª.

The device shown diagrammatically in Figs. 8 and 9 comprises merely a pin 170, which penetrates a boring in the shaft 10 and by the bolt 18 is linked to the rod 19 from the steering gear. In these figures the stanchion 11 is not shown, though it must be understood, that there is no material difference in this part of the device from those shown in the preparatory described embodiments of the invention. When it is desirable to release the shaft 10 from the influence of the steering gear, the pin 170 is removed from the shaft, and a sleeve or other suitable clutch is brought in action, which fixes the shaft 10 to the stanchion 11.

Such devices, however, can be designed in any various way, hence they are not illustrated here.

I want to repeat, that I do not limit myself to exactly the combinations of the various parts here described and illustrated, but they can be varied as desired, so that the tilting device in Figs. 3, 4 and 5 can be applied to rotatable shafts 10 with any of the embodiments shown in the Figs. 3-9 inclusive. Also I want to point out, that the details can be designed in several modified forms within the scope of the invention, as this is regulated by the following claims.

What I claim as new and want to protect by Letters Patent is:—

1. In combination with the frame of an automobile and its steering device, a tubular stanchion fixedly attached to said frame, a shaft carrying a headlight rotatably mounted within said stanchion, a sleeve slidably and rotatably mounted on said shaft connected with and actuated by the steering mechanism, means to move said sleeve up and down so as to couple and uncouple same with regard to said shaft, said means adapted also to couple and uncouple said shaft with regard to the frame, a coupling member on the shaft, a second sleeve, said means in the first mentioned case cooperating with the coupling member on the shaft, in the last mentioned case actuating the second mentioned sleeve cooperating with the first mentioned sleeve in its sliding motion independently of its revolving motion, the last mentioned sleeve being slidably but non-rotatably mounted on said headlight shaft and adapted in its upper position to couple said shaft immovably to the frame, a spring actuating said two sleeves whereby to normally keep the one sleeve in engagement with said headlight shaft and the other sleeve out of engagement with the automobile frame.

2. In combination with the frame of an automobile and its steering device, a tubular stanchion fixedly attached to said frame, a shaft carrying a headlight rotatably mounted within said stanchion, a sleeve slidably and rotatably mounted on said shaft connected with and actuated by the steering mechanism, means to move said sleeve up and down so as to couple and uncouple same with regard to said shaft, said means adapted also to couple and uncouple said shaft with regard to the frame, a coupling member on the shaft, a second sleeve, said means in the first mentioned case cooperating with the coupling member on the shaft, in the last mentioned case actuating the second mentioned sleeve cooperating with the first mentioned sleeve in its sliding motion independently of its revolving motion, the last mentioned sleeve being slidably but non-rotatably mounted on said headlight shaft and adapted in its upper position to couple said shaft immovably to the frame, a spring actuating said two sleeves whereby to normally keep the one sleeve in engagement with said headlight shaft and the other sleeve out of engagement with the automobile frame, an arm on said headlight shaft, a Bowden cable including an outer hose attached to said arm and a cable connected with the headlight and extended within reach of the automobile driver.

In testimony whereof I have affixed my signature.

AXEL T. NYBLOM.